(12) United States Patent
Hirano

(10) Patent No.: US 7,267,190 B2
(45) Date of Patent: Sep. 11, 2007

(54) ELECTRICALLY-DRIVEN VEHICLE

(75) Inventor: Akinori Hirano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 235 days.

(21) Appl. No.: 11/033,883

(22) Filed: Jan. 13, 2005

(65) Prior Publication Data
US 2005/0155802 A1 Jul. 21, 2005

(30) Foreign Application Priority Data
Jan. 16, 2004 (JP) ............................... 2004-009108

(51) Int. Cl.
*B60K 16/04* (2006.01)
(52) U.S. Cl. .................... 180/65.1; 180/68.5; 180/220
(58) Field of Classification Search ............... 180/65.1, 180/68.5, 220
See application file for complete search history.

(56) References Cited

U.S. PATENT DOCUMENTS

| 5,207,288 | A | * | 5/1993 | Ono | 180/220 |
| 5,396,970 | A | * | 3/1995 | Ono | 180/220 |
| 5,570,752 | A | * | 11/1996 | Takata | 180/206 |
| 5,577,747 | A | * | 11/1996 | Ogawa et al. | 180/220 |
| 5,853,058 | A | | 12/1998 | Endo et al. | |
| 6,047,786 | A | * | 4/2000 | Stevenson et al. | 180/65.1 |
| 6,176,338 | B1 | * | 1/2001 | Nakagawa et al. | 180/219 |
| 6,326,765 | B1 | * | 12/2001 | Hughes et al. | 320/104 |
| 6,357,542 | B1 | * | 3/2002 | Sako | 180/68.5 |
| 6,691,813 | B2 | * | 2/2004 | Schless | 180/220 |

FOREIGN PATENT DOCUMENTS

| EP | 0 444 975 A1 | 4/1991 |
| GB | 2 307 218 A | 5/1997 |
| JP | 2003-127941 A | 5/2003 |

* cited by examiner

*Primary Examiner*—Christopher P. Ellis
*Assistant Examiner*—Brian Swenson
(74) *Attorney, Agent, or Firm*—Birch, Stewart, Kolasch & Birch, LLP

(57) ABSTRACT

To efficiently arrange a plurality of batteries in a large-sized electrically-driven vehicle. An electrically-driven vehicle includes a vehicle body frame including a head pipe for supporting a steering shaft, upper frames which project in the vehicle-body lateral direction therefrom and extend in the rearward direction, lower frames, and rear frames which are connected with the lower frames. The vehicle body frame is configured in an approximately U-shape as a whole in a side view. In a space which is surrounded by the vehicle body frame, a plurality of batteries are arranged like stairs in parallel in the vehicle-body longitudinal direction along the approximately U-shape of the vehicle body frame.

20 Claims, 3 Drawing Sheets

ELECTRICALLY-DRIVEN VEHICLE

CROSS-REFERENCE TO RELATED APPLICATIONS

The present application is related to Japanese Patent Application No. 2004-009108 filed on Jan. 16, 2004 the entire contents of which are hereby incorporated by reference.

BACKGROUND OF THE INVENTION

1. Field of the Invention

The present invention relates to an electrically-driven vehicle, and more particularly to an electrically-driven vehicle having the structure which is capable of accommodating a battery of large capacitance.

2. Description of Background Art

An electrically-driven vehicle which is driven by an electrically-driven motor is known. As a power source for the electrically-driven vehicle, a battery is mounted on the electrically-driven vehicle. For example, JP-A-2003-127941 discloses an electrically-driven two-wheeled vehicle which includes a battery mounting structure for enhancing the replacing manipulability of the battery with respect to a vehicle body and for not impeding the getting on and off of occupants. In this electrically-driven two-wheeled vehicle, as shown in FIG. 3 of the present drawings, frames 100 are arranged on left and right sides of the vehicle body and include raised portions 101 extending vertically in the vicinity of the center in the vehicle-body in a longitudinal direction and horizontal portions 102 extending substantially horizontally rearwardly from the raised portions. A stay 103 projects frontwardly from the vicinity of a portion between the raised portions 101 and the horizontal portions 102. Further, a front portion of a seat 104 is rotatably mounted on a front end of the stay 103 with a battery casing 105 being mounted on the raised portions 101. In a state wherein the seat 104 is raised, the position shown in FIG. 3, an upper portion of the battery case 105 is opened. Thus, it is possible to insert or remove a battery 106 into or from the battery casing 105 in the longitudinal direction, that is, in the direction indicated by an arrow 107. In this manner, the battery 106 is held and accommodated in the battery casing 105 between the raised portions 101 of the frames 100 which are arranged on the left and right sides of the battery 106.

SUMMARY AND OBJECTS OF THE INVENTION

For example, a vehicle having a large weight, such as a large-sized scooter, requires a large battery capacitance. When a single battery is used, the battery is of a large-size. Thus, the arrangement position of the battery on the vehicle body is limited. Accordingly, here considered is a case in which a plurality of small-sized batteries are provided so as to increase the degree of freedom of the layout while ensuring a large capacitance.

The application of the battery arrangement structure disclosed in the above-mentioned publication to the large-sized scooter is considered. However, the conventional battery mounting structure, that is, the structure which mounts the battery in a state wherein the longitudinal direction of the battery is directed in the vertical direction of the vehicle body is suitable for a two-wheeled vehicle having a relatively small and light-weight vehicle body which can be driven with a single battery. Accordingly, with respect to a large-sized scooter or the like which requires a plurality of batteries, there exists a demand for a further improvement in the efficiency of the layout of the battery arrangement structure.

It is an object of the present invention to provide, with respect to an electrically-driven vehicle such as a large-sized scooter which requires a battery of a large capacitance, an efficient arrangement of a plurality of batteries by considering the structure of the vehicle body.

To achieve the above-mentioned object, according to a first feature of the present invention, an electrically-driven vehicle is provided that includes a vehicle body frame with a pair of left and right members extending in the vehicle-body longitudinal direction. A motor is provided for driving the vehicle body with batteries for supplying electric power to the motor. A plurality of batteries are arranged in the vehicle-body longitudinal direction in a space defined between the left and right members of the vehicle body frame. The batteries are replaceably mounted on the vehicle body frame in the direction which vertically traverses the extended direction of the members of the vehicle body frame.

Further, a second feature of the present invention lies in that the vehicle body frame is formed in an approximately U-shape in a state wherein the vehicle body frame is high at a front portion and a rear portion thereof and is low at an intermediate portion thereof. The plurality of batteries are arranged in a stair like arrangement along a shape of the vehicle body frame.

Further, a third feature of the present invention lies in that the electrically-driven vehicle includes a controller for performing an electric power supply control for the motor. The controller is arranged along the shape of the vehicle body frame together with the plurality of batteries.

Further, a fourth feature of the present invention lies in that the electrically-driven vehicle includes a cover member which is arranged above the vehicle body frame and covers an upper portion of the space defined between the left and right members of the vehicle body frame in a state wherein the cover member is capable of opening and closing the upper portion of the space. The cover member includes an occupant's seat having a rider's seat and a pillion which is positioned behind and higher than the rider's seat. At least two batteries are provided as the batteries and the two batteries are respectively arranged below the rider's seat and the pillion.

Further, a fifth feature of the present invention lies in that at least one of the plurality of batteries has a width which differs from the width of the other batteries to conform to an unfixed distance between the members of the vehicle body frame.

Further, a sixth feature of the present invention lies in that the vehicle body frame includes a narrowed portion where a distance between the members of the vehicle body frame is short at a front portion of a vehicle body, and at least one of the plurality of batteries has a width which differs from the width of the other batteries to conform to the narrowed portion of the vehicle body frame.

According to the first to sixth features, it is possible to mount the plurality of batteries by efficiently making use of the space which is elongated in the vehicle-body longitudinal direction and is surrounded by the vehicle body frame. Thus, it is possible to ensure a power source of a large capacitance in a relatively large electrically-driven vehicle such as a large-sized scooter. Further, since the plurality of batteries can be arranged along and inside the vehicle body frame, it is possible to simplify the appearance of the electrically-driven vehicle. Particularly, according to the second feature, since the batteries are arranged along the shape of the vehicle body frame, even when the vehicle body frame is covered with a cowl, it is sufficient to provide the cowl with a profile that substantially follows the vehicle body frame. Thus, it is possible to prevent the appearance from being enlarged.

According to the third feature, it is possible to arrange the controller along the vehicle body frame by making use of the space defined between the members of the vehicle body frame.

According to the fourth feature, the occupant seat having the rider's seat and pillion are arranged to be mounted like stairs with the batteries being aligned with each other. Thus, the batteries can be more efficiently accommodated.

According to the fifth feature, by making the widths of respective batteries different from each other with respect to the narrow space formed by the vehicle body frame, it is possible to efficiently make use of the space.

According to the sixth feature, in the vehicle adopting the structure which converges the vehicle body frame into a head pipe or the like which supports a steering shaft, it is possible to accommodate the batteries in a portion where the space which is formed by the vehicle body frame becomes narrow.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
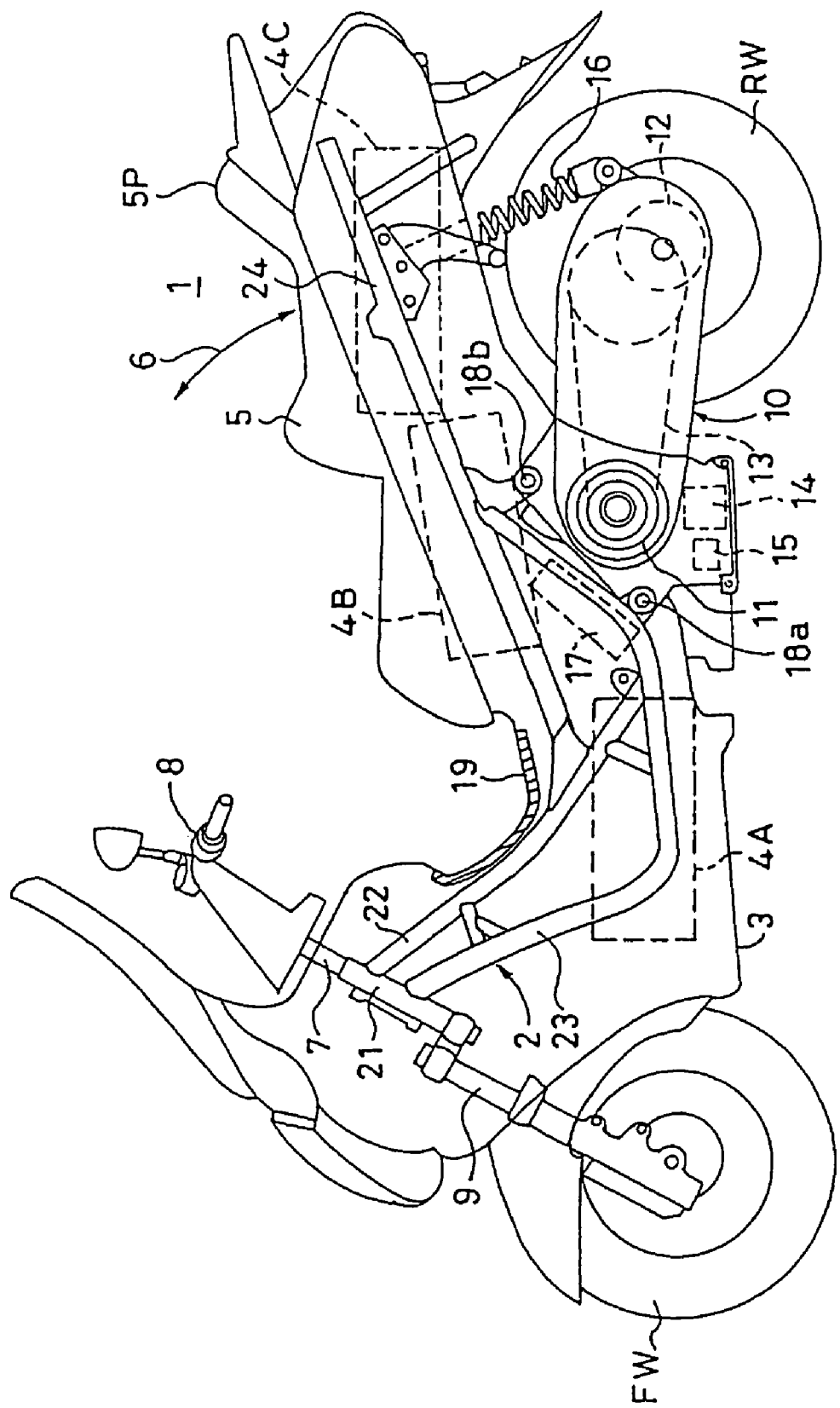
FIG. 1 is a side view of a motorcycle which constitutes an electrically-driven vehicle according to one embodiment of the invention.

Hereinafter, the present invention is explained in detail in conjunction with the drawings. The motorcycle 1 includes a vehicle body frame 2 and a cowl 3 which is supported on the vehicle body frame 2 and covers the vehicle body frame 2. In FIG. 1, to facilitate the understanding of the structure of the vehicle body frame 2 and the like, the cowl 3 is shown in a perspective manner and only a schematic profile of the cowl 3 is shown. The vehicle body frame 2 includes a head pipe 21 which is arranged at a front portion of the vehicle in a slightly rearwardly inclined manner with an upper frame 22 which has a front end thereof welded to the head pipe 21 and extending downwardly and rearwardly. A lower frame 23 is available which has a front end thereof welded to the head pipe 21 below the upper frame 22 and extends rearwardly. A rear frame 24 is provided which has a front end thereof bonded to the upper frame 22 and, at the same time, has a rear end of the lower frame 23 bonded to an intermediate portion thereof, and extends upwardly and rearwardly.

The upper frame 22 and the rear frame 24 which are bonded to each other form a V-shape in a side view, while the lower frame 23 forms a U-shape in a side view including a rear downward portion and a rear upward portion. That is, the vehicle body frame, as a whole, assumes a shape in which both of the vehicle-body longitudinal end portions are arranged at a high position and an approximate vehicle-body longitudinal center portion is arranged at a low position (referred to as "an approximately U-shape).

Figure 2:
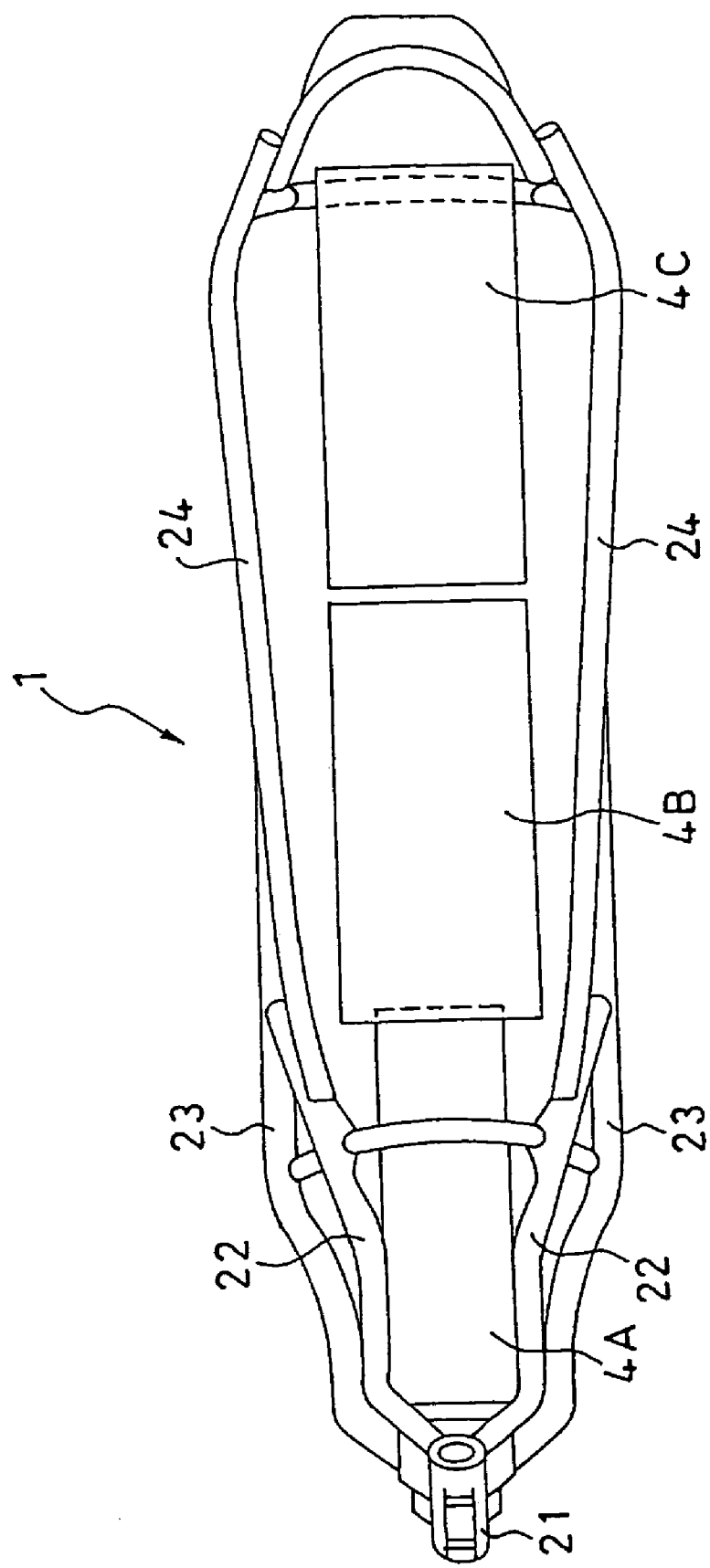
FIG. 2 is a plan view showing a vehicle body frame of the motorcycle as the electrically-driven vehicle according to one embodiment of the invention.
Figure 3:
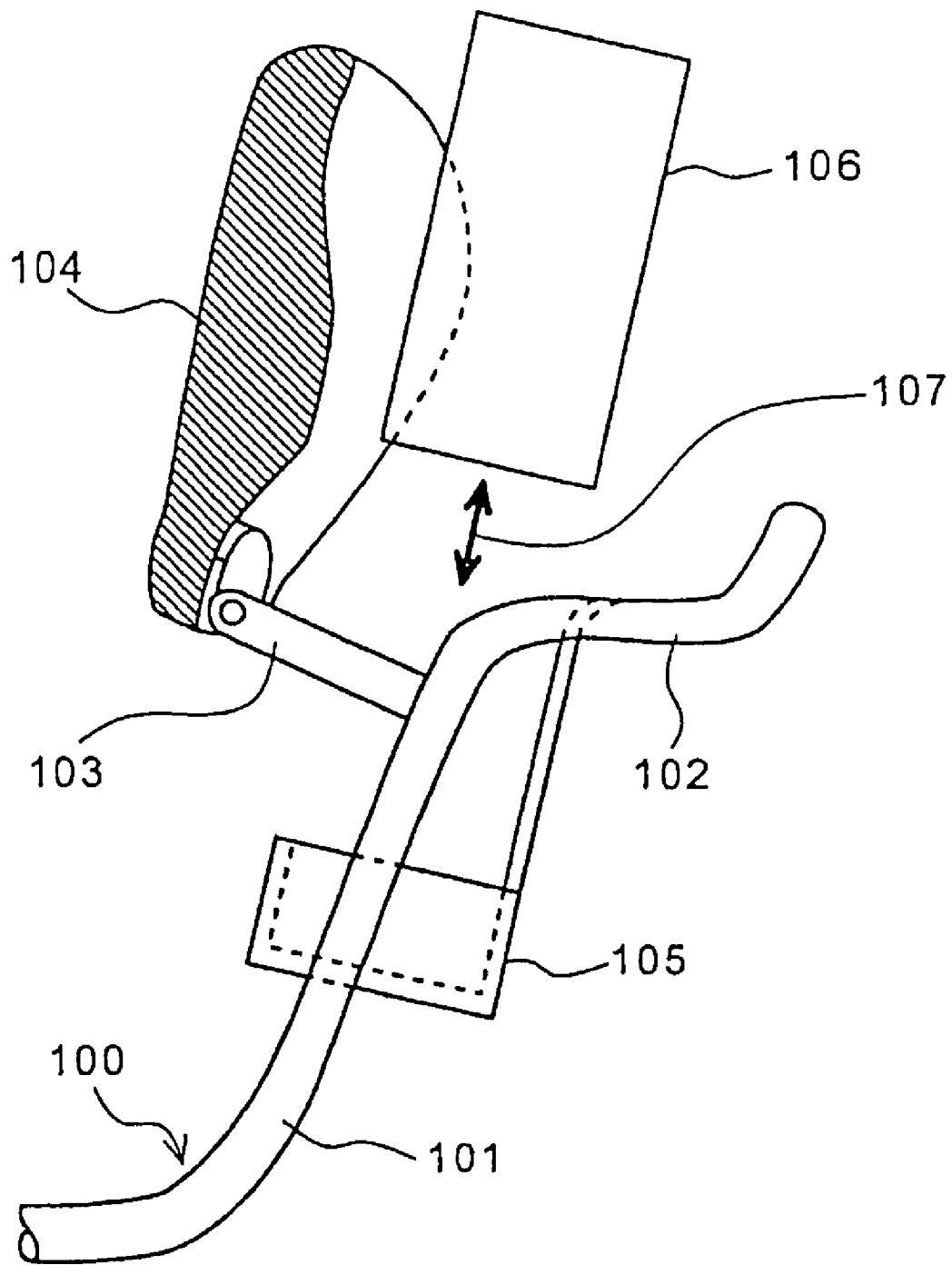
FIG. 3 is a view showing one embodiment of the battery mounting structure according to a prior art.

On the other hand, as can be understood from FIG. 2, the upper frames 22 and the lower frames 23 are bifurcated in the vehicle lateral direction from the head pipe 21 and extend rearwardly. That is, the above-mentioned respective frames 22, 23, 24 are provided in pairs laterally with respect to the vehicle. Batteries 4A, 4B, 4C are accommodated in a space which is surrounded by the respective lateral pairs of frames 22, 23, 24. The batteries 4A, 4B, 4C supply electric power to a drive member and a control member for the motorcycle 1. The batteries 4A to 4C are arranged in the vehicle-body longitudinal direction and are arranged like stairs to follow the vehicle body frame 2 having the above-mentioned approximately U-shape in a side view. That is, batteries 4A, 4B, 4C are arranged such that the battery 4A is positioned in the vehicle frontmost portion and the positions of the other batteries are elevated rearwardly in the order of the batteries 4B, 4C. That is, the batteries 4A to 4C are arranged along the rear portion (the rear frame 24) of the vehicle body frame 2 which is formed in an approximately U-shape.

The battery 4A has a width (a size in the vehicle widthwise direction) thereof which is set smaller as compared to the widths of the batteries 4B, 4C for allowing the battery 4A to be accommodated in the inside of the vehicle body frame 2 in conformity with the shape of the vehicle body frame 2 which is narrowed in the vicinity of the head pipe 21, that is, in the front portion of the vehicle body. Since the capacitance of the battery substantially corresponds to the size of the battery, it is possible to narrow the width of the battery 4A by reducing the capacitance of the battery 4A smaller than the capacitances of other batteries 4B, 4C.

The lower frames 23 and the rear frames 24 are provided with cross members or pans (not shown the drawings) which respectively hold the batteries 4A, 4B and 4C and the batteries 4A, 4B and 4C are mounted on these cross members or the pans.

Above the rear frames 24, an occupant seat 5 which also functions as a cover member is provided in a state wherein the occupant seat 5 covers the batteries 4B, 4C. The occupant seat 5 is constituted of a rider's seat and a pillion 5P which is arranged behind the rider's seat and is positioned higher than the rider's seat. Then, the occupant seat 5 has a front end portion thereof pivotally mounted on the vehicle body using the hinge structure such that the occupant seat 5 can be opened and closed in the direction indicated by an arrow 6.

A steering shaft 7 is inserted into the head pipe 21 with a handle 8 being connected to an upper end of the steering shaft 7, and a front fork 9 being connected to a lower end of the steering shaft 7. The front fork 9 supports a front wheel FW.

A power unit 10, which constitutes a drive member for the motorcycle 1, is pivotally supported on the lower frames 23 by shaft 18a, 18b. The power unit 10 includes an electrically operated motor 11 on a front portion thereof and a reduction gear 12 on a rear portion thereof. An output shaft of the reduction gear 12, which is not shown in the drawing, is connected with a rear wheel RW. The shaft 12 of the motor 11 and an input shaft of the reduction gear 12 are connected with each other by a belt 13 such that power can be transmitted. Below the motor 11, which is arranged on a front portion of the power unit 10, a drive member is accommodated which includes a driver circuit 14 for driving the motor 11 and a capacitor 15. A rear suspension device 16, which includes a shock absorber is provided between a rear portion of the power unit 10 and the rear frame 24. A similar rear suspension device is provided also on the right side of the vehicle body.

In front of the power unit 10, between the pair of left and right lower frames 23, a controller (control part) 17 of the drive member is provided which supplies electric power to the motor 11. The controller 17 has an appearance thereof configured in an elongated shape in a side view. The longitudinal direction of the controller 17 is arranged along rear portions of the lower frames 23, that is, along portions of the lower frames 23 which are arranged close to rear portion of the vehicle body and are raised obliquely and rearwardly toward the rear frames 24.

In the above-mentioned construction, when the batteries 4A, 4B and 4C are removed from the motorcycle 1 for charging or the like, portions above the batteries 4B, 4C are released by opening the occupant seat 5 and the batteries 4A to 4C are taken out through the released portion. First of all, either one of the batteries 4B, 4C is lifted upwardly and taken out. Another one of the batteries 4B, 4C is taken out in the same manner. Subsequently, since a space is defined by taking out the batteries 4B, 4C, it is possible to take out the battery 4A by lifting the battery 4A upwardly while pulling the battery 4A rearwardly through the space. Here, the battery 4A which is arranged in the foremost position may be removed through a door 19 which can be mounted between the occupant seat 5 and the head pipe 21 and above the cowl.

In the above-mentioned manner, by arranging the batteries in parallel in the vehicle-body longitudinal direction along the vehicle body frame 2, it is not necessary to project small support members such as stays from the vehicle body frame. That is, the plurality of batteries can be supported on the main members of the vehicle body frame. Thus, the vehicle body frame can be simplified and light-weight.

In this embodiment, among the plurality of batteries, only the battery 4A is arranged in the front portion of the vehicle body with a width thereof that is made small. However, the present invention is not limited to such a construction. For example, the sizes of all batteries 4A, 4B and 4C may be made different from each other corresponding to a shape in the vehicle widthwise direction of the vehicle body frame 1.

Further, the present invention is not limited to the use of batteries 4A, 4B and 4C which differ in size and capacitance from each other. For example, by modifying the arrangement, it is possible to use the same batteries for the batteries 4A, 4B and 4C. For example, the battery 4A which is arranged in the front portion of the vehicle body may be arranged in the vertical direction and the batteries 4B, 4C may be arranged in the lateral direction thus substantially making the width of the battery 4A smaller than the width of the other batteries 4B, 4C. Due to such an arrangement, while using the same batteries for the batteries 4A, 4B and 4C, the batteries can conform to the shape of the vehicle body frame 2. By allowing the plurality of batteries to have the same size, a charger for charging these batteries can be used in common and cumbersome time and efforts for controlling the plurality of batteries which differ in size becomes unnecessary. Thus, it is possible to expect a reduction in cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrically-driven vehicle including a vehicle body frame having a pair of left and right members extending in a vehicle-body longitudinal direction, a motor for driving a vehicle body, and batteries for supplying electric power to the motor, comprising:

a plurality of batteries arranged in the vehicle-body longitudinal direction in a space defined between the left and right members of the vehicle body frame with the batteries being replaceably mounted on the vehicle body frame in the direction which vertically traverses the extending direction of the members of the vehicle body frame, and a door for removing at least one of the batteries, wherein the door is arranged between an occupant seat and a head pipe.

2. The electrically-driven vehicle according to claim 1, wherein the vehicle body frame is formed in an approximately U-shape in a state wherein the vehicle body frame is high at a front portion and a rear portion thereof and is low at an intermediate portion thereof, the plurality of batteries being arranged like stairs along a shape of the vehicle body frame.

3. The electrically-driven vehicle according to claim 2, wherein the electrically-driven vehicle includes a controller for controlling the supply of electric power to the motor, and the controller is arranged in a position forward of a motor of a power unit of the vehicle and along the shape of the vehicle body frame together with the plurality of batteries.

4. The electrically-driven vehicle according to claim 3, wherein the electrically-driven vehicle includes a cover member which is arranged above the vehicle body frame for covering an upper portion of the space defined between the left and right members of the vehicle body frame in a state wherein the cover member is capable of opening and closing the upper portion of the space, said cover member includes an occupant's seat having a rider's seat and a pillion which is positioned behind the rider's seat and is positioned higher relative to the rider's seat, and at least the first one and a second one of the plurality of batteries are respectively arranged below the rider's seat and the pillion.

5. The electrically-driven vehicle according to claim 3, wherein at least a third one of the plurality of batteries has a width which differs from widths of other batteries to conform to an unfixed distance between the members of the vehicle body frame, the third one of the batteries being arranged in a position that is lower than the controller.

6. The electrically-driven vehicle according to claim 3, wherein the vehicle body frame includes a narrowed portion wherein a distance between the members of the vehicle body frame is short at a front portion of a vehicle body, and at least a third one of the plurality of batteries has a width which differs from a width of the first battery to conform to the narrowed portion of the vehicle body frame.

7. The electrically-driven vehicle according to claim 2, wherein the electrically-driven vehicle includes a cover member which is arranged above the vehicle body frame for covering an upper portion of the space defined between the left and right members of the vehicle body frame in a state wherein the cover member is capable of opening and closing the upper portion of the space, said cover member includes an occupant's seat having a rider's seat and a pillion which is positioned behind the rider's seat and is positioned higher relative to the rider's seat, and at least the first one and a second one of the plurality of batteries are respectively arranged below the rider's seat and the pillion.

8. The electrically-driven vehicle according to claim 7, wherein at least a third one of the plurality of batteries has a width which differs from widths of other batteries to conform to an unfixed distance between the members of the vehicle body frame, the third one of the batteries being arranged in a position that is lower than the controller.

9. The electrically-driven vehicle according to claim 4, wherein the vehicle body frame includes a narrowed portion wherein a distance between the members of the vehicle body frame is short at a front portion of a vehicle body, and at least a third one of the plurality of batteries has a width which differs from a width of the first battery to conform to the narrowed portion of the vehicle body frame.

10. The electrically-driven vehicle according to claim 2, wherein at least a third one of the plurality of batteries has a width which differs from widths of other batteries to conform to an unfixed distance between the members of the vehicle body frame.

11. The electrically-driven vehicle according to claim 2, wherein the vehicle body frame includes a narrowed portion wherein a distance between the members of the vehicle body frame is short at a front portion of a vehicle body, and at least a third one of the plurality of batteries has a width which differs from a width of the first battery to conform to the narrowed portion of the vehicle body frame.

12. The electrically-driven vehicle according to claim 1, wherein at least a third one of the plurality of batteries has a width which differs from widths of other batteries to conform to an unfixed distance between the members of the vehicle body frame.

13. The electrically-driven vehicle according to claim 1, wherein the vehicle body frame includes a narrowed portion wherein a distance between the members of the vehicle body frame is short at a front portion of a vehicle body, and at least a third one of the plurality of batteries has a width which differs from a width of the first battery to conform to the narrowed portion of the vehicle body frame.

14. An electrically-driven vehicle body frame comprising:
a pair of left and right members extending in a vehicle-body longitudinal direction;
a plurality of mounting areas adapted to receive a battery for supplying electric power; and
a plurality of batteries arranged in the vehicle-body longitudinal direction in the mounting areas that are formed in a space defined between the left and right members of the vehicle body frame with the batteries being replaceably mounted on the vehicle body frame in the direction which vertically traverses the extending direction of the members of the vehicle body frame, wherein a first one of the plurality of batteries is arranged over a rear wheel of the vehicle and extends farther rearwardly than a rear side of a final reduction gear.

15. The electrically-driven vehicle body frame according to claim 14, wherein the vehicle body frame is formed in an approximately U-shape in a state wherein the vehicle body frame is high at a front portion and a rear portion thereof and is low at an intermediate portion thereof, the plurality of batteries being arranged like stairs along a shape of the vehicle body frame.

16. The electrically-driven vehicle body frame according to claim 15, wherein the electrically-driven vehicle includes a controller for controlling the supply of electric power to a motor, and the controller is arranged in a position forward of a motor of a power unit of the vehicle and along the shape of the vehicle body frame together with the plurality of batteries.

17. The electrically-driven vehicle body frame according to claim 15, wherein the electrically-driven vehicle includes a cover member which is arranged above the vehicle body frame for covering an upper portion of the space defined between the left and right members of the vehicle body frame in a state wherein the cover member is capable of opening and closing the upper portion of the space, said cover member includes an occupant's seat having a rider's seat and a pillion which is positioned behind the rider's seat and is positioned higher relative to the rider's seat, and at least the first one and a second one of the plurality of batteries are respectively arranged below the rider's seat and the pillion.

18. The electrically-driven vehicle body frame according to claim 16, wherein the electrically-driven vehicle includes a cover member which is arranged above the vehicle body frame for covering an upper portion of the space defined between the left and right members of the vehicle body frame in a state wherein the cover member is capable of opening and closing the upper portion of the space, said cover member includes an occupant's seat having a rider's seat and a pillion which is positioned behind the rider's seat and is positioned higher relative to the rider's seat, and at least the first one and a second one of the plurality of two batteries are respectively arranged below the rider's seat and the pillion.

19. The electrically-driven vehicle body frame according to claim 14, wherein at least a third one of the plurality of batteries has a width which differs from a width of the first battery to conform to an unfixed distance between the members of the vehicle body frame.

20. An electrically-driven vehicle including a vehicle body frame having a pair of left and right members extending in a vehicle-body longitudinal direction, a motor for driving a vehicle body, and batteries for supplying electric power to the motor, comprising:

a plurality of batteries arranged in the vehicle-body longitudinal direction in a space defined between the left and right members of the vehicle body frame with the batteries being replaceably mounted on the vehicle body frame in the direction which vertically traverses the extending direction of the members of the vehicle body frame, wherein the vehicle body frame is formed in an approximately U-shape in a state wherein the vehicle body frame is high at a front portion and a rear portion thereof and is low at an intermediate portion thereof, the plurality of batteries are being arranged like stairs along a shape of the vehicle body frame, wherein the electrically-driven vehicle includes a controller for controlling the supply of electric power to the motor, and the controller is arranged obliquely with respect to a length of the vehicle body frame.

* * * * *